(12) United States Patent
Ängeby

(10) Patent No.: US 7,877,195 B2
(45) Date of Patent: Jan. 25, 2011

(54) METHOD FOR THE ESTIMATION OF COMBUSTION PARAMETERS

(75) Inventor: Jacob Ängeby, Karlstad (SE)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 389 days.

(21) Appl. No.: 11/887,185

(22) PCT Filed: Apr. 1, 2005

(86) PCT No.: PCT/SE2005/000487

§ 371 (c)(1),
(2), (4) Date: Oct. 29, 2007

(87) PCT Pub. No.: WO2006/104434

PCT Pub. Date: Oct. 5, 2006

(65) Prior Publication Data

US 2009/0132145 A1    May 21, 2009

(51) Int. Cl.
G06F 19/00 (2006.01)
G06F 17/00 (2006.01)
G06F 17/18 (2006.01)
G06F 17/40 (2006.01)

(52) U.S. Cl. .................. 701/115; 701/102; 702/182

(58) Field of Classification Search .............. 73/114.67, 73/114.02, 114.03, 114.04, 114.05, 114.06, 73/114.07, 114.08, 114.09, 114.011, 114.16, 73/114.22; 701/102, 110, 111, 114, 115; 123/406.14, 406.17, 406.22, 406.41, 435, 123/111, 114; 702/182, 183, 184, 185, 186, 702/187, 188

See application file for complete search history.

(56) References Cited

U.S. PATENT DOCUMENTS

| 5,452,603 | A |   | 9/1995 | Asano et al. |
| 5,861,551 | A | * | 1/1999 | Morita et al. ............. 73/114.67 |
| 6,029,627 | A | * | 2/2000 | VanDyne .................... 123/435 |
| 6,614,230 | B2 |   | 9/2003 | Raichle et al. |
| 2004/0094124 | A1 |   | 5/2004 | Viele et al. |

FOREIGN PATENT DOCUMENTS

| JP | 2003097343 | 4/2003 |
| SE | 504197 | 12/1996 |

OTHER PUBLICATIONS

Lars Nielson and Lars Eriksson, "An Ion-Sense Engine Fine-Tuner", Oct. 1998, IEEE, 0272-1708/98.*
English Abstract of JP 2003097343.
English Abstract of SE 504197.

* cited by examiner

*Primary Examiner*—Stephen K Cronin
*Assistant Examiner*—Raza Najmuddin
(74) *Attorney, Agent, or Firm*—Dykema Gossett PLLC

(57) ABSTRACT

Method for combustion engine control comprising an engine, at least one sensor and at least one engine control unit (200) arranged to control the engine (100) by the use of real time sensor data S(k) characterized in that a prior ($P_1(k, j; z)$, $P_2(k; X, Y)$) is used to derive at least one combustion parameter estimate (X(k)) and/or at least one combustion parameter measurement (Y(k)) from the real time sensor data (S(k)) and that the at least one combustion parameter estimate (X(k)) and/or the at least one combustion parameter measurement (Y(k)) is used in performing said engine control.

7 Claims, 14 Drawing Sheets

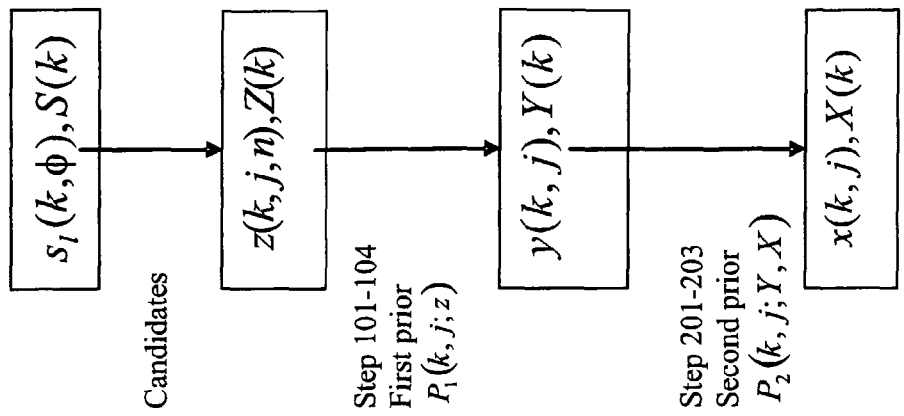
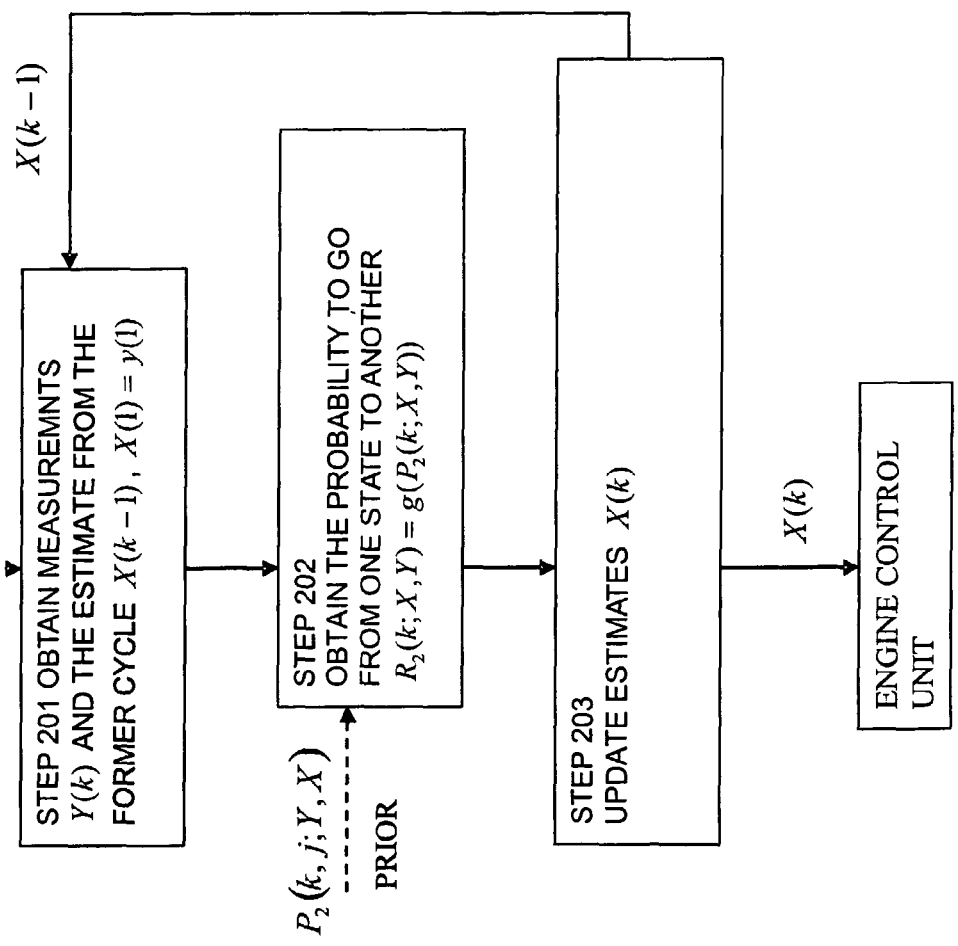
Fig 5
Fig 4

Fig. 8g
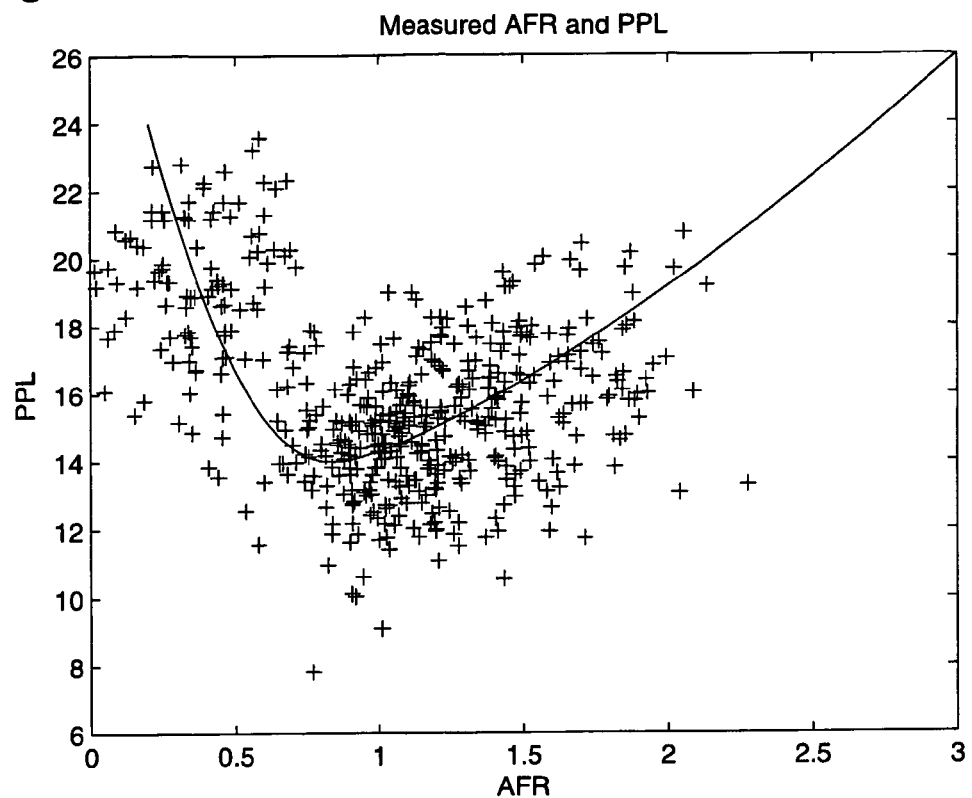
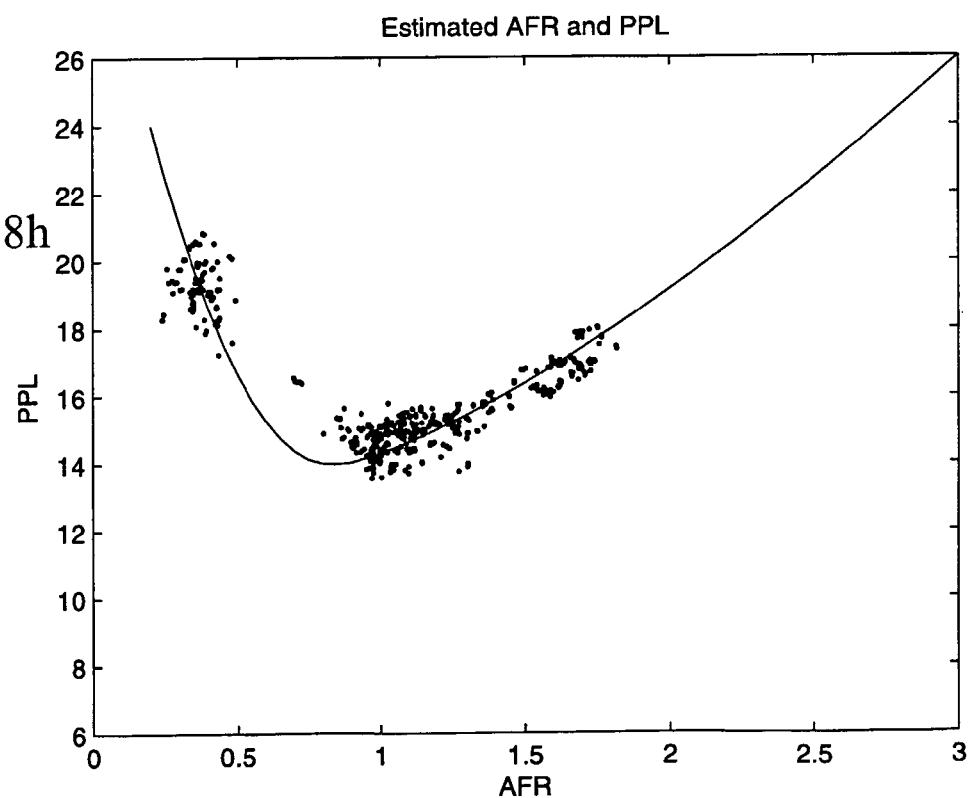
Fig. 8h

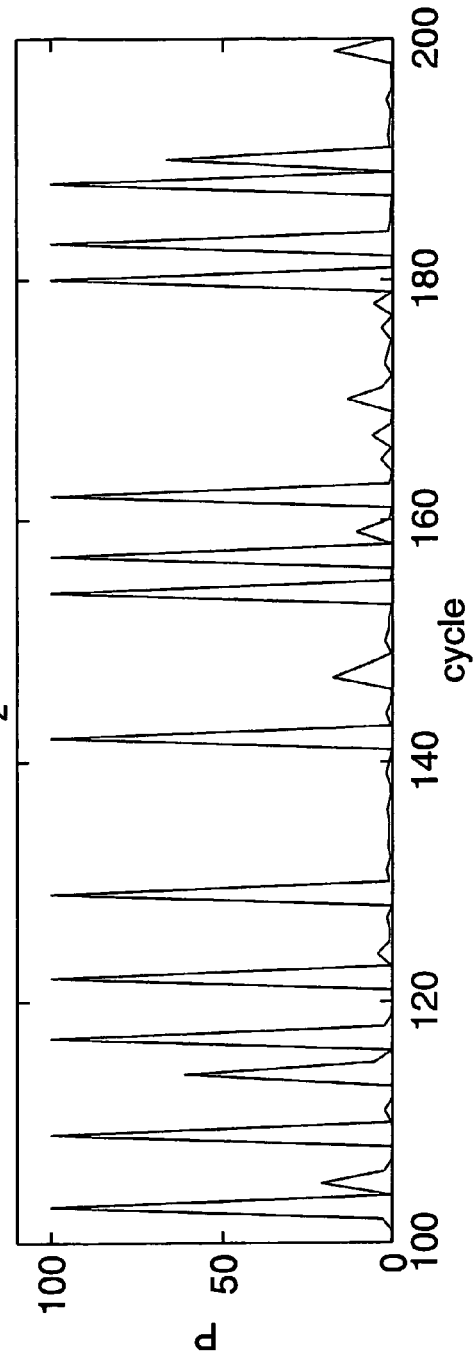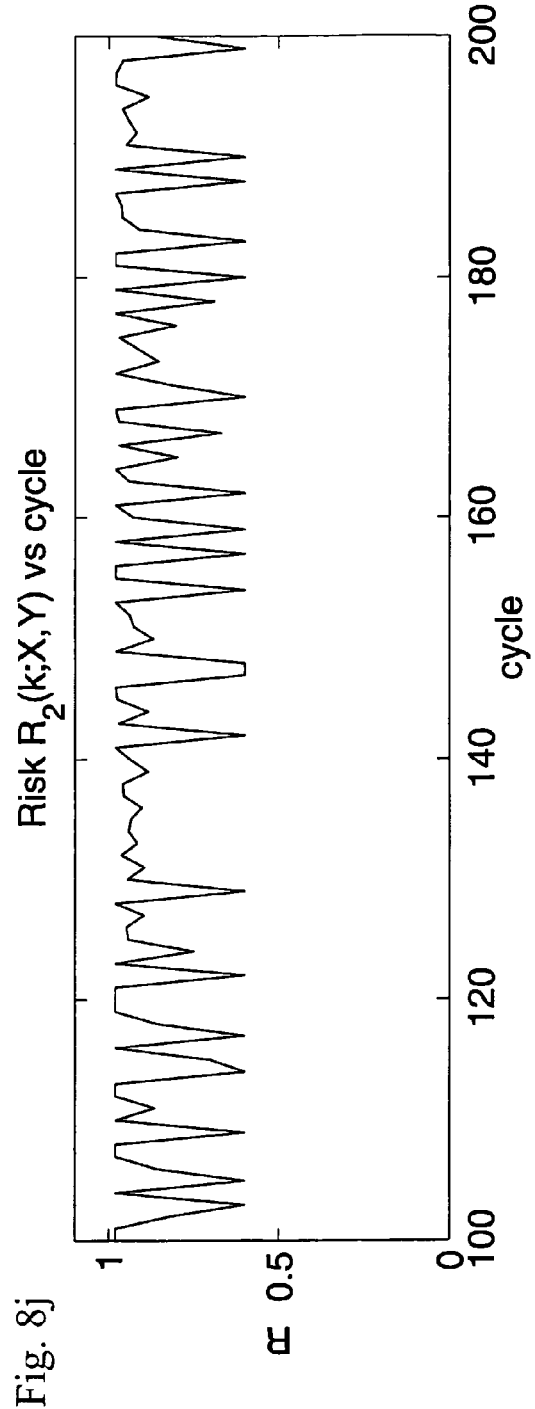
Fig. 8i
Fig. 8j

METHOD FOR THE ESTIMATION OF COMBUSTION PARAMETERS

CROSS REFERENCE TO RELATED APPLICATIONS

This application is a U.S. national phase of PCT/SE2005/000487, filed 1 Apr. 2005. The priority of this PCT application is claimed.

TECHNICAL FIELD

The present invention relates to method for controlling a combustion engine, more specifically the method concerns estimating combustion parameters from sensor data input. Such combustion parameter estimates can be used by an engine control system for optimizing the performance of the engine and enable close loop real-time strategies for the engine control.

BACKGROUND OF THE INVENTION

Due to the hostile environment in the cylinders, it is a challenge to retrieve necessary information about the combustion process cycle-by-cycle. Without such information, it is impossible to optimize the overall engine efficiency and stability and to minimize emissions.

Control of Otto engines basically amounts to controlling three primary variables: ignition timing and fuel and air injected into the cylinder. For the two latter both the mass and the timing are important and these are controlled separately using different actuators such as the throttle, the fuel injectors, and the intake valves depending on engine design and mode of operation. For Diesel engines the main control variables are timing and mass of injected fuel. The main actuators for diesel engine control are, consequently, the fuel injectors. In today's engine control systems, most of the control functionality is implemented inform of look-up tables, which give the optimal ignition timing, say, for a certain operating point of the engine and at certain prevailing ambient condition. These systems require extensive calibration tests to meet the performance requirements under all driving conditions, including varying speed and load, fuel quality, air temperature, air pressure, air humidity, etc. Calibration of an engine management system is therefore typically a very time consuming and expensive task and, sometimes, the result is not satisfactory. There is a need for supplements to look-up tables in order to enable more efficient control of the engine.

It has been suggested to use continuous, i.e., cycle by cycle, measurements of the combustion conditions (combustion feedback signal) in order to eliminate the need of extensive calibration. Ionisation current measurements and in-cylinder pressure measurements are two possible ways of obtaining the desired information (combustion feedback signal) for engine control, as is known from, e.g., SE-504197. The combustion feedback signal can be measured either directly in the combustion chamber, (as is known per se from e.g., R. Muller, M. Hart, A. Truscott, A. Noble, G. Rrotz, M Eickhoff, C. Cavalloni, and M. Gnielka, "Combustion Pressure Based Engine Management System", SAE paper no. 2000-01-0928, 2000; J. Auzins, H. Johansson, and J Nytomt, "Ion-gap sense in misfire detection, knock and engine control", SAE paper no. 950004, 1995) or indirectly using non-intrusive sensors (as is known per se from, e.g., M. Schmidt, F. Kimmich, H. Straky, and R. Isermann, "Combustion Supervision by Evaluating the Crankshaft Speed and Acceleration", SAE paper no. 2000-01-0558, 2000; M. Sellnau, F. Matekunas, P. Battiston, C-F. Chang, and D. Lancaster, "Cylinder-Pressure-Based Engine Control Using Pressure-Ratio-Management and Low-Cost Non-Intrusive Cylinder Pressure Sensors", SAE paper no. 2000-01-0932, 2000). As described in said publications (and publications defined below), these measurements can be used for closed-loop engine control and enable realtime optimisation with respect to desired features such as fuel consumption, emissions, power and stability. Also, the measurements can be used for misfire and knock detection, individual cylinder air/fuel ratio control, camshaft phasing, control of start-of-combustion, EGR rate control, etc. See, e.g., Muller et al. (2000); Sellnau et al. (2000) according to the above, or H. Wilstermann, A. Greiner, P Hohner, R. Kemmler, R. Maly, and J. Schenk, "Ignition System Integrated AC Ion Current Sensing for Robust and Reliable Online Engine Control", SAE paper no. 2000-01-0553, 2000; or L. Nielsen and L. Eriksson, "An Ion-Sense Engine Fine-Tuner", IEEE Control Systems, 1998.

In order for an engine control system to operate correctly in a closed loop, it must have sufficient and accurate combustion process related information. However, this information is hard to retrieve due to the hostile environment. Moreover, the interrelation between the combustion parameters may be very complex and therefore extremely difficult to handle in both open and closed-loop control systems. If, for instance, the fuel/air mixture is changed of some reason, then the burn rate will change, which in turn leads to a change in the peak pressure position that is used for closed-loop ignition timing control (e.g. SE 504 197). This leads to a sub optimization, which results in decreased efficiency of the engine and higher emission levels. The root cause to this problem is that only a subset, if any, of the combustion parameter values of interest are available to the engine control system. The invention alleviates these problems by providing robust and accurate combustion parameter estimates cycle by cycle.

There are several combustion parameter estimates that are necessary in a closed-loop control system in order to enable a better performance of the engine. Some examples follow.

Peak Pressure Location (PPL) is a parameter that describes the location of the crankshaft, i.e. the crank angle degree, when the pressure in the cylinder is at its maximum. The engine has an optimal performance when the peak pressure is achieved at a certain crank angle. If the PPL diverges from the optimal value, it is advantageous to adjust PPL so as to return to the optimal value. This can be done in several ways, for example by changing the ignition time or the air/fuel ratio.

Mass Fraction Burnt (MFB) is a parameter, which indicates at which crank angle degree a certain amount of the fuel mixture has been combusted. This parameter is strongly correlated to PPL.

Air Fuel Ratio (AFR) is a parameter stating the ratio between air and fuel in the mixture. The performance of an engine depends of the AFR and the optimal value varies with temperature, humidity and other factors. Therefore it is important to control and measure the AFR in order to control the engine for optimal performance. If AFR can be measured individually for each cylinder, then it is possible to balance each cylinder, thus achieving an optimal AFR for each cylinder. Slate of the art is to measure the AFR using a lambda sensor in the exhaust manifold, i.e., the mean of the AFR in the cylinders connected to the manifold is measured. In this case cylinder balancing with respect to AFR is not possible.

Knock is a parameter that depicts when non-combusted fuel self ignites due to increased pressure and temperature. When the fuel mixture is ignited and a flame front is spread from the sparking plug, the pressure and temperature increases drastically and a knock may be initialized. Knocking combustions are uncontrolled and large pressure peaks, which are harmful to the engine, may occur. Knock can be avoided by advancing the spark timing. However, this reduces the performance of the engine. To achieve maximum performance from an engine it is often preferable to run close to the knock limit, which is dependent of the fuel quality (fuel grade). By knock detection the engine control system can control the engine to work at optimal performance without passing the knock limit.

Misfire is when the fuel mixture fails to ignite. Law regulates the amount of allowed misfires in an engine since non-combusted gases are harmful to both the environment and the car catalyst.

Combustion Stability is a parameter relating to the stability of the combustion process from cycle to cycle. Large variations in the engine combustion can be perceived as a non-smooth jerky performance and is therefore undesirable.

Torque is of interest, especially when using automatic gears. It is preferred to have zero "moment" from the engine during shift of gears.

In conventional engine control the engine is commonly calibrated in an experimental environment by the use of high quality measurement probes such as sophisticated lambda and cylinder pressure sensors. The calibration data are thereafter used to create look-up tables from which the engine management system reads the parameter settings for different engine work conditions, e.g. spark timing and AFR setting for a given RPM and work load. A problem with this approach is that it does not solve real-time problems such as varying fuel quality and air humidity and wearing of the engine or individual differences between the cylinders. Hence the engine tends to run on non-optimal engine settings. If the combustion parameters could be estimated in real-time with high enough accuracy and robustness, then the engine control could work in a closed loop and these problems would be alleviated.

The combustion parameters mentioned above can to some extent be measured using different probes that are dedicated to the specific application, e.g., a lambda sensor to measure the AFR, a piezo-electric vibration sensor mounted on the engine to measure knock and measurements of the crank axis acceleration in order to detect misfires. There are sensors, however, that can be used to estimate all of the above mentioned combustion parameters.

Pressure probes are often used during development of an engine and measures the pressure directly in the cylinder. However, pressure probes are expensive and have a short life span and have therefore not yet been used in serial production.

Ion-current sensor systems are alternatives to pressure sensors. When the fuel mixture is combusted, electrons and ions are formed which make the gas conductive, i.e., it achieves the ability to carry an electric current. The concentration of charged particles in the combusted gas depends on the pressure and temperature in the cylinder. Hence, by applying a voltage over the spark plug and measure the resulting current, information about the combustion process can be retrieved. Through ion-current data analysis it is possible to estimate all combustion parameters, but hither ion-current measurement has only been used for estimation of knock and misfire when used in serial production due to the stochastic nature of ion-current. There is a potential to improve this technology considerably using the signal processing proposed in the present innovation.

Known strategies for estimation of combustion parameters from, e.g., ion-current measurements can be divided into two main categories. The first category consists of algorithms that estimate the combustion parameters by looking for characteristic "phenomenon" in the combustion measurements that correlates to a reference measurement. Such phenomena can be a maximum, an inflexion point or other criteria in the data. However, this approach is difficult to apply over all working conditions of the engine since the type of phenomenon that correlates with the combustion parameter may depend on the actual workload conditions of the engine (REM, load, etc.). Hence, a local maximum can be of interest during a certain workload condition, but in another workload condition an inflexion point is more suitable. Therefore, this approach in reality encounters considerable practical problems and hence the usability becomes limited. In this approach no a priori knowledge such as the parameter probability distribution or a signal model is utilized.

The second approach is to use a deterministic signal model that describes the combustion process. The model is then parameterized by a set of parameters that are estimated from the data. An example of such a model that has been applied to ion-current measurements is a sum of "Gaussian bulbs" (e.g Se 504 197). The model is fitted to the data in a least square sense with respect to the parameters, thus yielding model parameter estimates. The combustion parameters are then derived from the estimated Gaussian model. So, for example, the AFR can be estimated from the slope of the first gauss-curve and the PPL can be estimated from the top of the second gauss-curve. This approach uses a priori knowledge of the combustion process in the form of a deterministic signal model. However, the match between the data and the model limits the success of this approach. So, if the model does not have the ability to accurately describe the data, then the quality of the estimated combustion parameters will not be adequate. This will be the case when the model structure is not correct or the degree of freedom in the model is not high enough. Unfortunately, to, find a model that accurately describes the data in all practical engine operation points is very hard.

US 2002/0078930 describes a control device controlling an engine where the AFR can be changed in accordance to the running environment. In WO 96/05419 a method and a system for adaptive correction of the amount of fuel supplied to two-stroke combustion engines. U.S. Pat. No. 6,505,500 describes an arrangement for detecting ionization in the combustion chamber of a combustion motor where the fuel self-ignites by means of compression, as well as associated measurement device and calibration devises. U.S. Pat. No. 6,526, 954 describes a system for regulating me fuel-air mixture m internal combustion engine. The system utilizes binary sensors to detect relative deviations from stoichiometric combustion, including individual combustion events, and allows for regulation to achieve optimal and similar combustion to take place in all the cylinders. In CA2281621 a controller receives the ionization signal and controls the air/fuel ratio in the engine based at least in part upon the ionization signal. In a preferred embodiment of the control system, the controller controls the air/fuel ratio based upon a first local peak in the ionization signal. In another embodiment, the controller controls the air/fuel ratio based upon maximizing the first local peak in the ionization signal.

SUMMARY OF THE INVENTION

The invention is a method for estimating combustion parameters in internal combustion engines. It widens known strategies for combustion parameter estimation by using prior knowledge. This is done by a linear or non-linear transform of measurement data to a representation that is used in an algorithm for detection or estimation of combustion parameters. The invention can be divided into two main parts. First, the prior is formed. Second, the prior is used in an estimation algorithm. Hereby the combustion parameters can be estimated in real-time with high quality using the prior information, thus enabling adaptive combustion control and a significant improvement of the quality and robustness of the estimates is achieved as compared to if this information (prior) had stayed unused.

The invention makes it possible to use cheap combustion parameter sensors. The measurements from such sensors cannot be used as they are in a closed engine control loop since they are not accurate and robust enough. The invention refines the information contained in the measurements and produces estimates of high quality and reliability.

The invention makes it possible to extract information contained in the combination of combustion parameter measurements from one cycle to another. This information has not been extracted before in the context of combustion parameter estimation using the method of the invention. Using the invention the combustion parameter estimates will be more robust, and more accurate than if the invention had stayed unused, hereby enabling closed loop control that has the potential to drastically improve the performance of internal combustion engines.

Moreover, the invention makes it possible to estimate many combustion parameters simultaneously. In many engine control and diagnosis applications this is vital since the proper control action may be hard to determine without reliable estimates of a set of combustion parameters.

The prior can be created using physical relationships, measurements or a combination of the two. For example, the probability density distribution of the PPL and AFR can be estimated through measurements in an experimental environment using probes of high reliability such as an in-cylinder pressure sensor and lambda sensor. The PPL and AFR are then repeatedly measured for different settings of AFR. From the measurements an estimated probability density function as a function of AFR and PPL can be computed as illustrated in FIGS. 7a-d. This prior can then be used in a non-experimental application when estimating the AFR and PPL from, e.g., ion-current signals that are usually less reliable. It is also possible to use prior physical knowledge to determine a prior. For example, given the spark advance and the fuel quality and the load and the RPM it is known at which crank angle the peak pressure is expected.

In general, the prior is computed using some kind of linear or non-linear transformation of measurement data collected in an experimental setup, typically with high quality measurement probes. The prior is a representation that describes how the combustion parameters relate to each other and can be interpreted as a statistical description in the form of an estimated or computed function that is proportional to the probability density function.

Thus the present invention describes a method for combustion engine control comprising an engine, at least one sensor and at least one engine control unit arranged to control the engine by the use of real time sensor data and where a prior is used to derive at least one combustion parameter estimate and/or at least one combustion parameter measurement from the real time sensor data and that the at least one combustion parameter estimate and/or the at least one combustion parameter measurement is used in performing said engine control.

And according to further aspects of the invention
the prior may at least to some extent be in the form of a look-up table.
the prior may at least to some extent be a linear or non-linear transform of the measurement data.
within a single combustion cycle, a prior is used in order to select one combustion parameter measurement candidate from a set of candidates as the combustion parameter measurement,
the candidate with the lowest risk is chosen as the combustion parameter measurement.
the combustion parameter estimates from former combustion cycles, real time sensor data and combustion parameter measurements and a prior are used to obtain a combustion parameter estimate of the current combustion cycle.
the combustion parameter estimate of the current combustion cycle is derived using a risk function based on a prior and the combustion parameter estimates from former combustion cycles and the combustion parameter measurement of the current cycle.
the prior is to some extent derived from combustion theory.
the prior is to some extent derived from practical experiments in a model engine.
the prior is to some extent updated by analyzing the performance of the engine during the operation of the engine.

BRIEF DESCRIPTION OF DRAWINGS

FIG. 4 shows a scheme on how to produce a final estimate of a combustion parameter using prior estimates,
FIG. 5 shows an overview of the variables used in the proposed algorithm.

DESCRIPTION OF THE INVENTION

Figure 1:
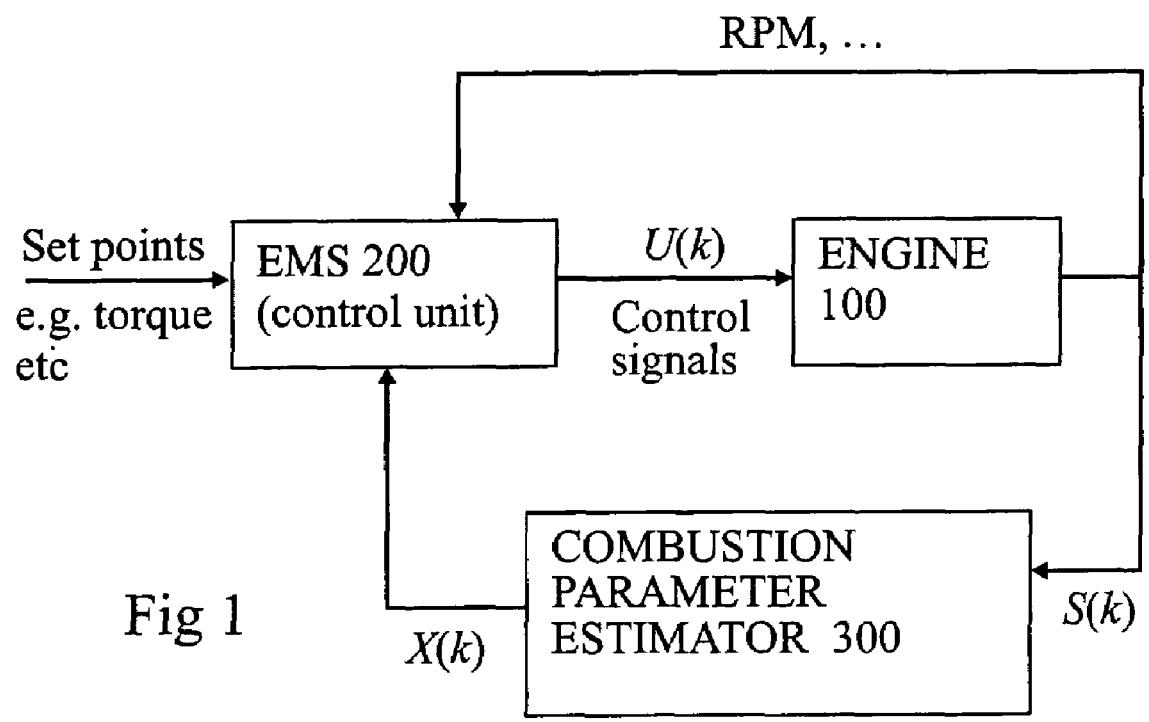
FIG. 1 shows a schematic overview over an engine and a system comprising a combustion parameter estimator.

FIG. 1 shows an overview of combustion control system for an engine according to a preferred embodiment of the present invention. An engine control unit 200 controls an engine 100 by the use of control signals U. The control signals U can control different aspects of the engine 100 such as fuel mixture and ignition time etc. for each cylinder in the engine and for each combustion cycle. By controlling the engine 100 the performance of engine 100 can be improved w.r.t., e.g., fuel consumption, emissions and power. In order to determine the control signals U the engine control unit 200 is provided with feedback information from the performance of the engine 100. The engine control unit 200 receives input such as RPM and load from the engine 100, torque (throttle) demand from the driver and combustion parameter estimates X(k) derived from sensor measurements S(k) using the combustion parameter estimator 300. Of course, the combustion parameter estimator 300 could be an integrated part of engine control unit 200. The combustion parameter estimator 300 receives some kind of combustion process measurements S(k) from the engine 100. The inputs S(k) can be any combustion sensor output, e.g., ion current. The combustion parameter estimator 300 estimates combustion parameter estimates X(k) which is sent to the engine control unit 200 for use in controlling the engine 100. For example, PPL, AFR and MFB can be estimated in the combustion parameter estimator 300. The present invention concerns the estimation methods in the combustion parameter estimator 300.

Figure 2:
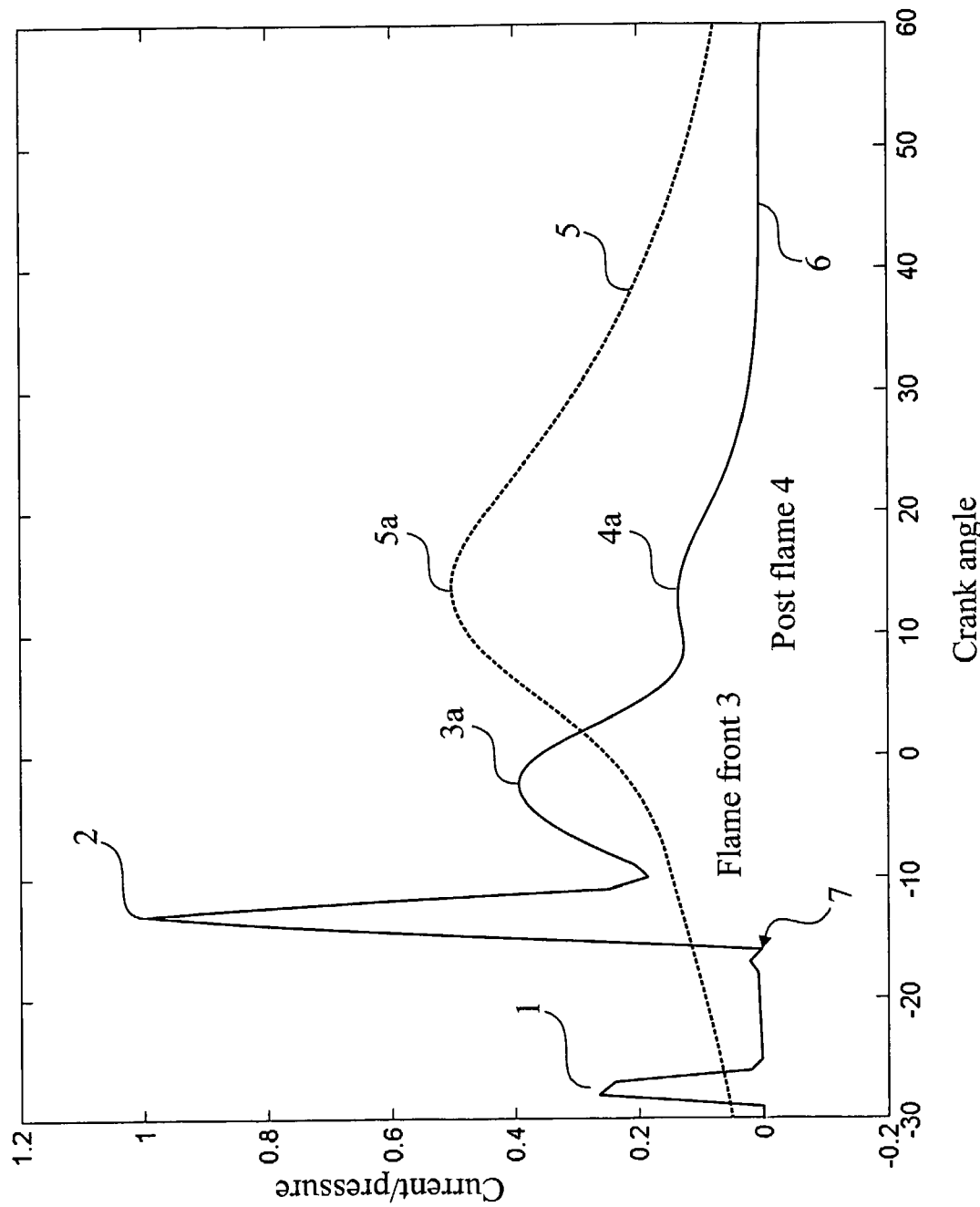
FIG. 2 shows the mean of 100 cycles of the ion current and the pressure in a cylinder.

FIG. 2 is a graph over the ion current 6 as a function of the crank axis degree during a combustion cycle. Also, the in-cylinder pressure curve 5 as a function of crank angle degree is shown. Consider the ion current curve. The first maximum corresponds to the start of dwell, i.e., when the current in the primary side of the ignition system starts to flow. The end of the peak is when the spark begins. At the beginning of the second peak, marked 7 in FIG. 6, the spark ends. After the spark has ended there is a second peak marked 7 in FIG. 2. This peak is due to a "coil ringing" when the rest energy in the ignition system dissipates. After the coil ringing peak the flame front 3 in the cylinder can be seen having a flame front peak 3a. The flame front 3 is followed by the post flame 4, which has a post flame peak 4a. The pressure curve 5 has a peak pressure location 5a (PPL 5a), i.e. indicating the maximum pressure in the cylinder. The pressure increases due to the gas expansion, as the fuel mixture is combusted. It is known that PPL 5a is correlated to the peak 4a of the post flame in the ion current. A straight-forward approach would be to search for a maximum in the ion current and pick this as a measurement of the PPL. However, in practice this is hot successful of two reasons. First, the flame front and the post flame may be so close to each other at some RPM:s and loads, that the PPL is hot visible as a maximum but as an inflexion point. Second, the ion current is usually not as smooth as depicted in FIG. 2 and mere may be many local maxima and inflexion points, which makes it hard to determine which one of them that corresponds to the PPL. So, there may be several "candidates" to a PPL measurement based on the ion current. Let $z(k, j, n)$ denote the candidates to a combustion parameter measurement, where $k=1, \ldots K$ is a running index that denotes the cycle number and $j=1 \ldots J$ denotes the combustion parameter index (e.g. PPL, AFR etc.), and $n=1 \ldots N$ denotes the "candidate" number. It remains to choose the candidate $z(k, j, n)$ that corresponds to the PPL, i.e., the one that is the most probable.

In the following, let
$s_1(k, \Phi)$ denote a measurement of the combustion process (e.g., ion current), where $l=1, \ldots, L$ is the sensor index, $k=1 \ldots K$ is a running index for the cycle number and $\Phi \in [-360, 360]$ is the crank axle degree,
$v(k, j)$ denote the combustion parameters, where $j=1 \ldots J$ is the combustion parameter index (e.g., $j=1$ denotes PPL, $j=2$ denotes AFR etc),
$z(k, j, n)$ denote the candidates to a measurement of $v(k, j)$, where $n=1 \ldots N$ denotes the "candidate" number,
$R_1(k, j, n)$ denote the "risk" associated with choosing candidate $z(k, j, n)$ as the measurement, i.e., a measure of the probability that the candidate is the measurement,
$P_1(k, j; z)$ denote the prior function used to compute the risk $R_1(k, j, n)$, i.e., $R_1(k, j, n) = f(P_1(k, j; z(k, j, n)))$, where $f(\cdot)$ is some function, and
$y(k, j)$ denote the measurement of $v(k, j)$.

In this invention $y(k, j)$ is called a measurement, regardless of how $y(k, j)$ was derived. This is of practical reasons in order to avoid confusion below, when the estimate $x(k, j)$ is introduced. However, here $y(k, j)$ can be either an output from a sensor (i.e., a measurement) or a combustion parameter value derived from an ion-current signal (i.e., an estimate in the words strict sense). Here, the term estimate is reserved for the result of a simultaneous estimation of at least two combustion parameters using a prior.

Figure 3:
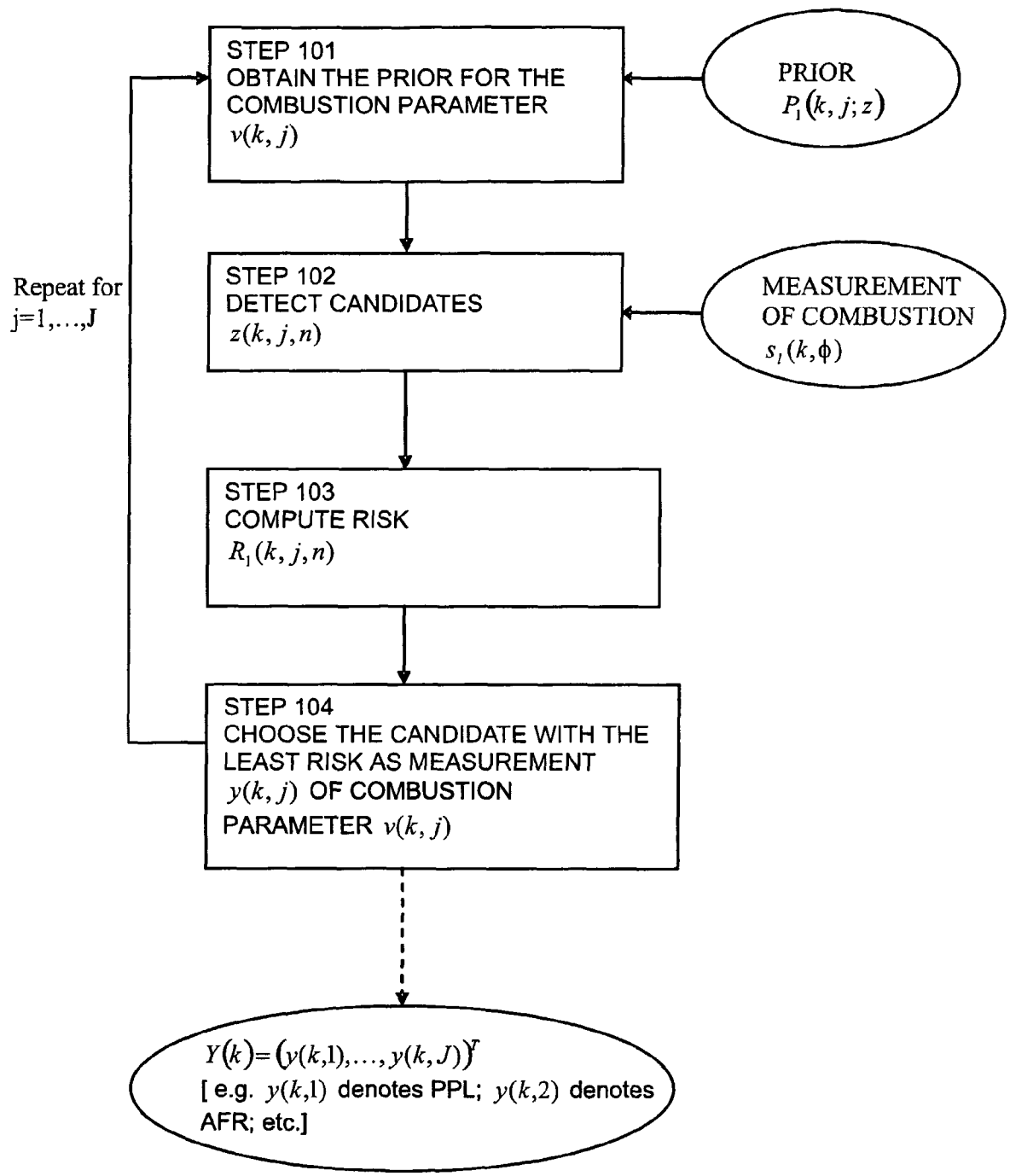
FIG. 3 shows a scheme on how to choose a single candidate from a set of candidates according to the invention thereby obtaining a combustion parameter measurement.

FIG. 3 shows a method on how to choose a single candidate from a set of candidates according to the invention. This is done using a prior and performed using the four steps 101-104. Step 101-104 can be repeated for each parameter j.

In step 101 a prior is derived. The prior is a function from which the probability that a certain candidate is the measurement of the combustion parameter can be computed. For example, in the example with PPL measurement above, it is known when the spark was fired and it pretty well known how fast the air-fuel mixture burns. This information, in combination with knowledge about the design of the engine determines when to expect the PPL. So, the base for a prior for PPL estimation can be me spark timing plus a constant that may depend on RPM and load. In general, the prior can be a function of data in a look up table and it can be computed using a linear or non-linear transform of measurement data. Given the prior, a measure of the probability that $z(k, j, n)$ is a measurement of $v(k, j)$ can be computed using $R_1(k, j, n)$, which is done in step 103. First, however, the candidates need to be computed.

In step 102 the at least one candidate $z(k, j, n)$ is computed from the data. In the PPL example above, the candidates for a PPL measurement $z(k, 1, 1)$ to $z(k, 1, n)$ are the crank axis degrees corresponding to all local maxima and inflexion points in the ion current, see FIGS. 6a and 6b. A candidate may, however, be characterized by other phenomena in the collected data depending on which combustion parameter $v(k, j)$ that is to be estimated. The invention does not claim how these candidates $z(k, j, n)$ are obtained; rather the method to choose one of them as the measurement of the combustion parameter (se step 104).

In Step 103 the "risk" $R_1(k, j, n)$ is computed for each candidate $z(k, j, n)$. $R_1(k, j, n)$ is a function that gives a measure of the probability that candidate $z(k, j, n)$ is the measurement of the combustion parameter $v(k, j)$ and in the signal processing literature this is often denoted a "risk function". Note, however, that minimizing the risk is equivalent to maximizing the probability of choosing the right candidate as the measurement. In the following it is assumed that $R_1(k, j, n)$ reflects the risk, but it could just as well be a function that reflects the probability to choose the right candidate. So, if $R_1(k, j, 1) R_1(k, j, 2)$, then $z(k, j, 2)$ is associated with less risk, or equivalently, it is more probable than $z(k, j, 1)$ as a measurement of $v(k, j)$. Consequently $z(k, j, 2)$ should be chosen as the measurement, i.e., $y(k, j)=z(k, j, 2)$. The invention is hot limited to how the risk $R_1(k, j, n)$ is computed, rather to the fact that an estimate of the risk (or the probability of choosing the right candidate) based on a prior is used in the estimation process.

In the example of PPL estimation, the risk can be taken as the geometrical distance between the candidate $z(k, j, n)$ and the expected value of the PPL as computed from the spark timing as described above; i.e., the prior $P_1(k, j; z)=E[PPL(k)]$ where $E[PPL(k)]$ denotes the expected value of the PPL for combustion cycle k. Then this risk function can be expressed as $R_1(k, j, n)=|E[PPL(k)]-z(k, j, n)|$. This implicitly assumes a symmetrical probability density function. If the probability density function were not symmetrical, then a risk function that takes this into account would be more appropriate.

Figure 2A:
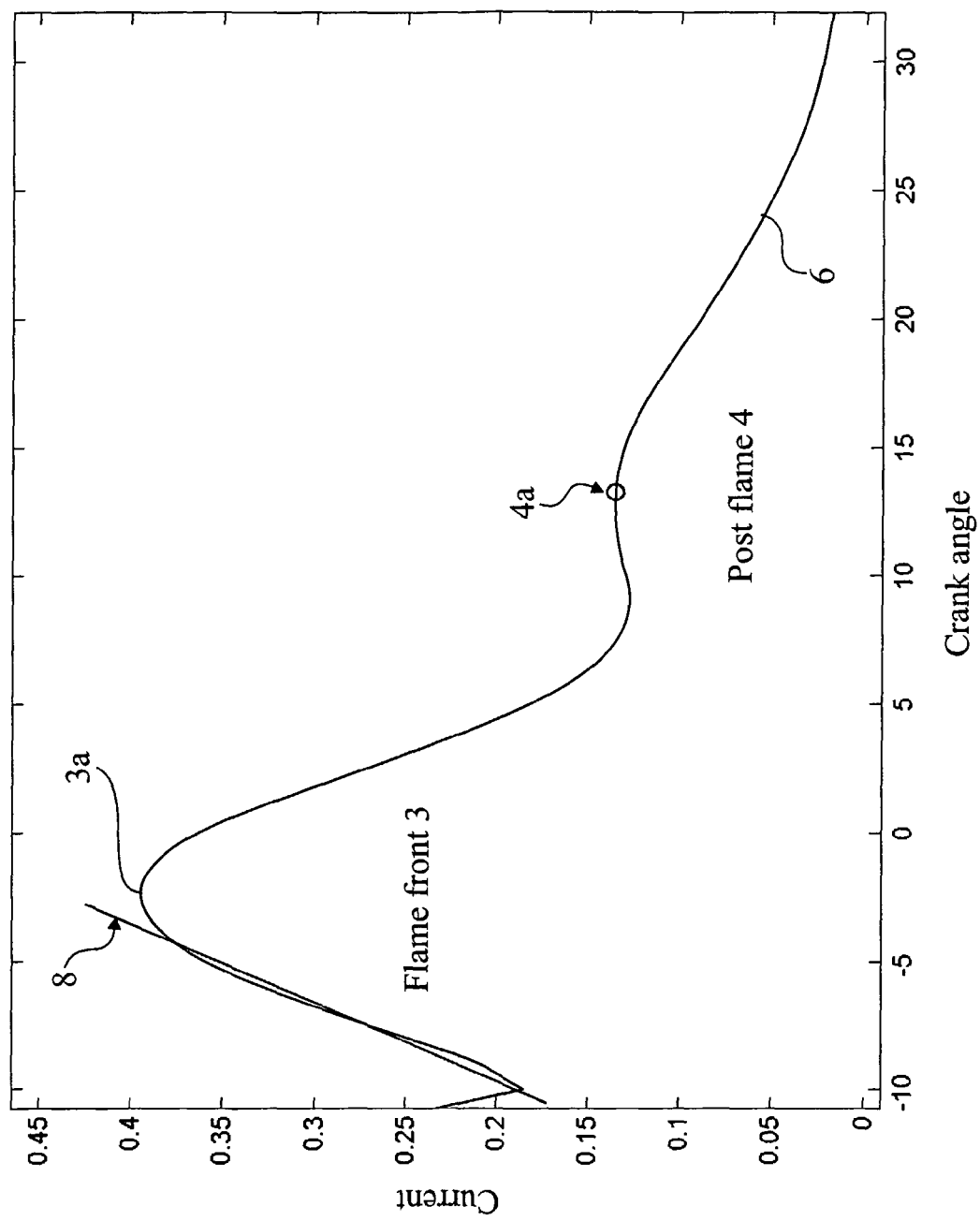
FIG. 2a shows a zooming of FIG. 2.

In step 104 the measurement y(k, j) of the combustion parameter v(k, j) is obtained as the candidate z(k, j, n) that minimizes the risk $R_1(k, j, n)$. There are, however, combustion parameters for which there is only, one candidate. Consider, for example, a measurement of the AFR based on ion current. FIG. 2*a* shows a zooming of the ion current 6 of FIG. 2. The slope 7 of the rising flank of the flame front of the ion current 6 is known from combustion theory to be well correlated with the air/fuel ratio AFR. Thus, the derivative 7 can be used as a measurement y(k,2) of the AFR. In this example, there are no other candidates for the measurement and therefore no further processing based on a prior for a single combustion cycle is necessary. However, it is known that the PPL and the AFR are closely correlated due to physical relationships, which will be exploited in the following.

Let x(k, j) denote an estimate of v(k, j) which is the result of a simultaneous estimation of at least two combustion parameters using a prior. For convenience, introduce the following vector notations:

$V(k)=(v(k, 1), \ldots, v(k, J))^T$, where $\cdot^T$ denotes transpose,
$Y(k)=(y(k, 1), \ldots, y(k, J))^T$,
$X(k)=(x(k, 1), \ldots x(k, J))^T$.

Furthermore, let $R_2(k; X, Y)$ denote the "risk" function, i.e. a probability measure, associated with a combustion parameter state transition from $X(k-1)$ to $Y(k)$: $0 \leq R_2(k; X, Y) \leq 1$.

$P_2(k; X, Y)$ denote a prior used to compute the risk, e.g., a function or table: $R_2(k; X, Y)=g(P(k; X, Y))$ where $g(\cdot)$ is some function.

The general form for a Bayesian estimator is $$\hat{x} = \int xp(x|y)dx = E(x|y),$$

where p(x|y) is the probability density function for (the combustion parameters) x given the measurements y and E(x|y) denotes the expected value of x given y. Such an estimator can be implemented in several ways but is generally very hard to obtain in a closed form. In the following, the structure of a recursive implementation is given as an example of how a prior can be used in a real-time estimation that enables a closed loop control or monitoring of the combustion process in the cylinders.

Example

It is well known how the AFR and PPL are related to each other. Assume a prior $P_2(k; X, Y)$ has been constructed for these two parameters. Consider the case when the measurement Y(k) takes a value that is different from, but much less likely than, the estimate X(k−1) achieved during the previous cycle. Then the new estimate X(k) should not be changed from (the more likely) X(k−1) to the less likely) measurement Y(k) since it may be disturbed by noise. The estimate should be updated "towards" the measurement Y(k), but not be set equal to Y(k). Preferably the updated estimate X(k) should be set to a value somewhere in-between X(k−1) and Y(k), depending on the value of the estimated risk $R_2(k; X, Y)$ to move from state X(k−1) to Y(k). FIG. 4 shows a second method to obtain a combustion parameter estimate X(k) of higher quality than the measurement Y(k) using a prior $P_2(k; X, Y)$ and the former estimate X(k−1).

In step 201 of FIG. 4 estimated values of the parameters from the previous cycle X(k−1) is used together with the measurement Y(k). Said measurement Y(k) can be obtained using the method of steps 101-104, but the invention is not limited to the use of steps 101-104. Other means of receiving measurements Y(k) can be used. The estimates X(k) are obtained by means of iteration (steps 201-203) with an exception of the starting position when a starting vector X(1)=(1) is used.

In step 202 the risk $R_2(k; X, Y)$ is computed using the prior $P_2(k; X, Y)$. How the prior is constructed is not essential for the invention. Any table or linear or non-linear transform of data that is proportional to a probability measure to go from state X(k−1) to Y(k) can be used. For example, the prior $P_2(k; X, Y)$ can be constructed by measuring combustion parameters in an experimental setting (engine dynamometer) using high quality sensors. The combustion parameters are measured over a large number of cycles and recorded for a number of engine working points. Then the measurements can be used to construct a histogram. Let this histogram be denoted by H(X), where X is the combustion parameter state vector. The histogram is a look-up table and can be viewed as an "engine map" with the combustion parameters as table indexes and a measure of the probability for the corresponding combination of combustion parameters as entries.

The histogram can, for example, then be used to form the prior as follows $$P_2(k; X, Y) = \frac{H(Y(k))}{H(X(k-1))},$$

i.e., the prior is defined as the ratio between the probabilities (i.e., values in the histogram), which then will reflect the probability to go from state X(k−1) to Y(k). The prior can, of course, also be made to incorporate known physical relationships (e.g. the relationship between burn rate and AFR). It can also be made data dependent, i.e., the prior may be optimized w.r.t. the data in an adaptive manner to compensate for variations in, e.g., the fuel quality or air humidity. In the example considered above, $P_2(k; X, Y)<0$ since $H(X)<0$. Now, the risk can, for example, be computed as follows $$R_2(k; X, Y) = \exp\left\{-\frac{P_2(k; X, Y)}{\sigma}\right\},$$

where $\exp\{\cdot\}$ denotes the natural logarithm and $\sigma<0$ is a design parameter. This risk function can be used to improve the performance of sensors of less accuracy than those used when forming the prior. In general, the function $P_2(k; X, Y)$ used to compute the risk $R_2(k; X, Y)$ is defined by the user and may be a linear or non-linear transform of data, or it may be construed by the use of information from engine tests, correlations between parameters, theoretical and experimental knowledge about parameter distributions and behavior as well as other factors.

In step 203 a final estimate of V(k) denoted by X(k) is computed using the estimate from the previous cycle X(k−1), the measurements Y(k) of the current cycle and the risk $R_2(k; X, Y)$ as follows $X(k)=R_2(k;X,Y)\cdot X(k-1)+(1-R_2(k; X, Y))\cdot Y(k)$, hereby minimizing the overall risk.

In order to clarify the basic idea behind steps 202-203, consider a case when the measurement Y(k) is much less likely than the estimate from the previous cycle X(k−1), i.e., the risk to go from state X(k−1) to Y(k) is high such that $P_2(k; X, Y) < \sigma$. Then, using the prior suggested above, it follows that $R_2(k; X, Y) \approx 1$.

In this case the estimate should be updated with only a small weight assigned to Y(k), i.e., the updated estimate will be close to the previous estimate, $X(k) \approx X(k−1)$. If, on the other hand, the measurement Y(k) is much more likely than the estimate from the previous cycle, then $P_2(k; X, Y) < \sigma$ and $R_2(k; X, Y) \approx 0$. Then the risk to perform the state transition indicated by the measurement Y(k) is low and therefore a heavy weight should be assigned to Y(k) such that $X(k) \approx Y(k)$.

As can be seen from the parameter estimate updating formula, a recursion approach has been used. Of course, it is also possible to use other algorithms than this basic approach to obtain the final estimate using prior information. For instance, a weighting based on the covariance matrix of Y(k) could be used to achieve a more efficient updating. The focus of the invention is to use a prior for the estimation of combustion parameters.

FIG. 5 shows the hierarchy of variables in the method.

Sensor data $s_1(k, \Phi)$ is collected from sensor outputs. From the sensor data candidates z(k, j, n) for the measurement y(k, j) are derived, in matrix and vector form, respectively, denoted by Z(k) and Y(k) as defined above. By applying the steps 101-104 to the candidates z(k, j, n) using the first prior $P_1(k, j; z)$, the measurement Y(k) is derived, which is used in steps 201-204 with the second prior $P_2(k; X, Y)$, the risk function $R_2(k; X, Y)$ and the previous estimate X(k−1) to finally obtain the estimate X(k) of the combustion parameters V(k).

Figure 6A:
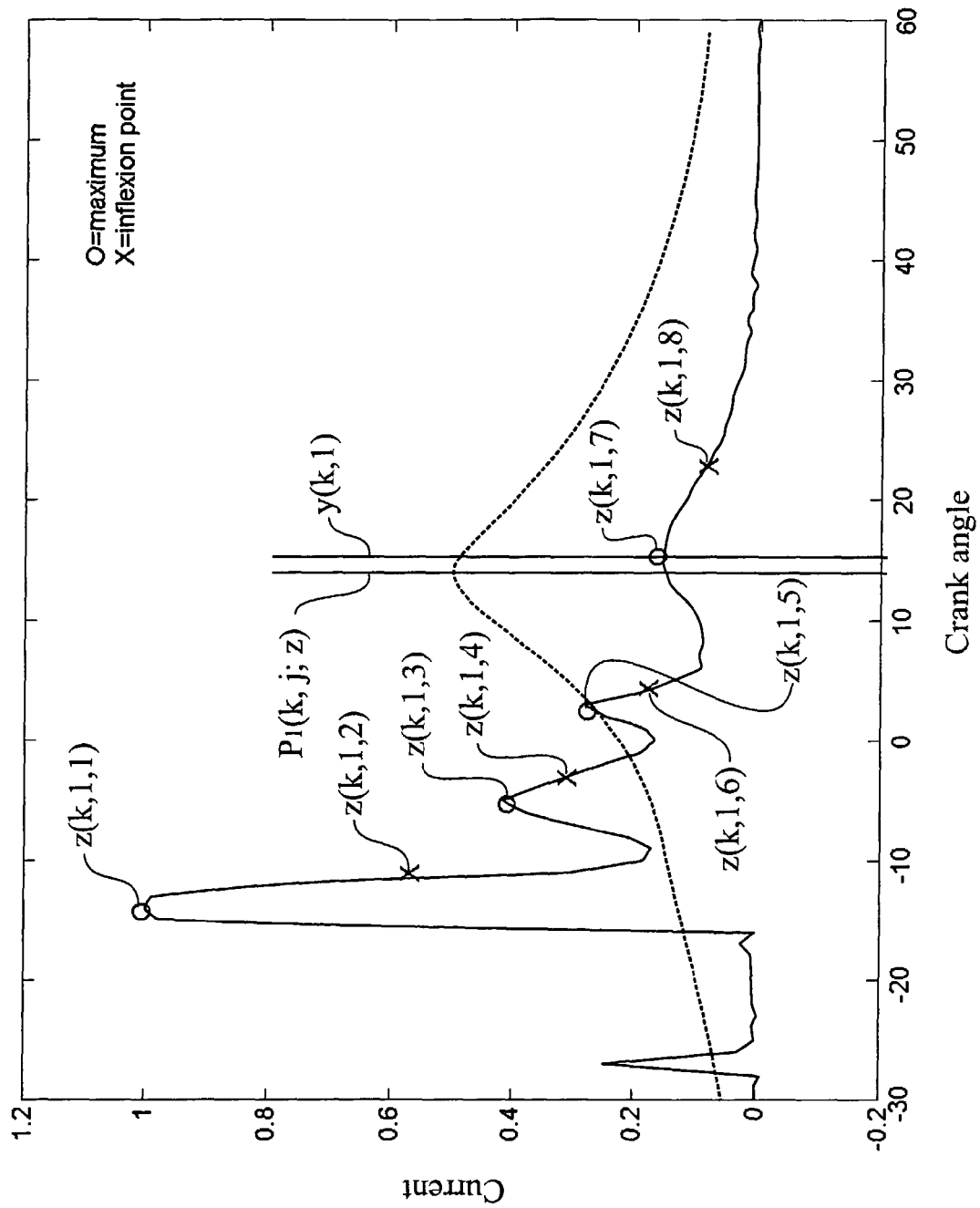
FIG. 6a shows the ion current during a single cycle and a set of candidates for the peak pressure location where the PPL is found at a local maximum.
Figure 6B:
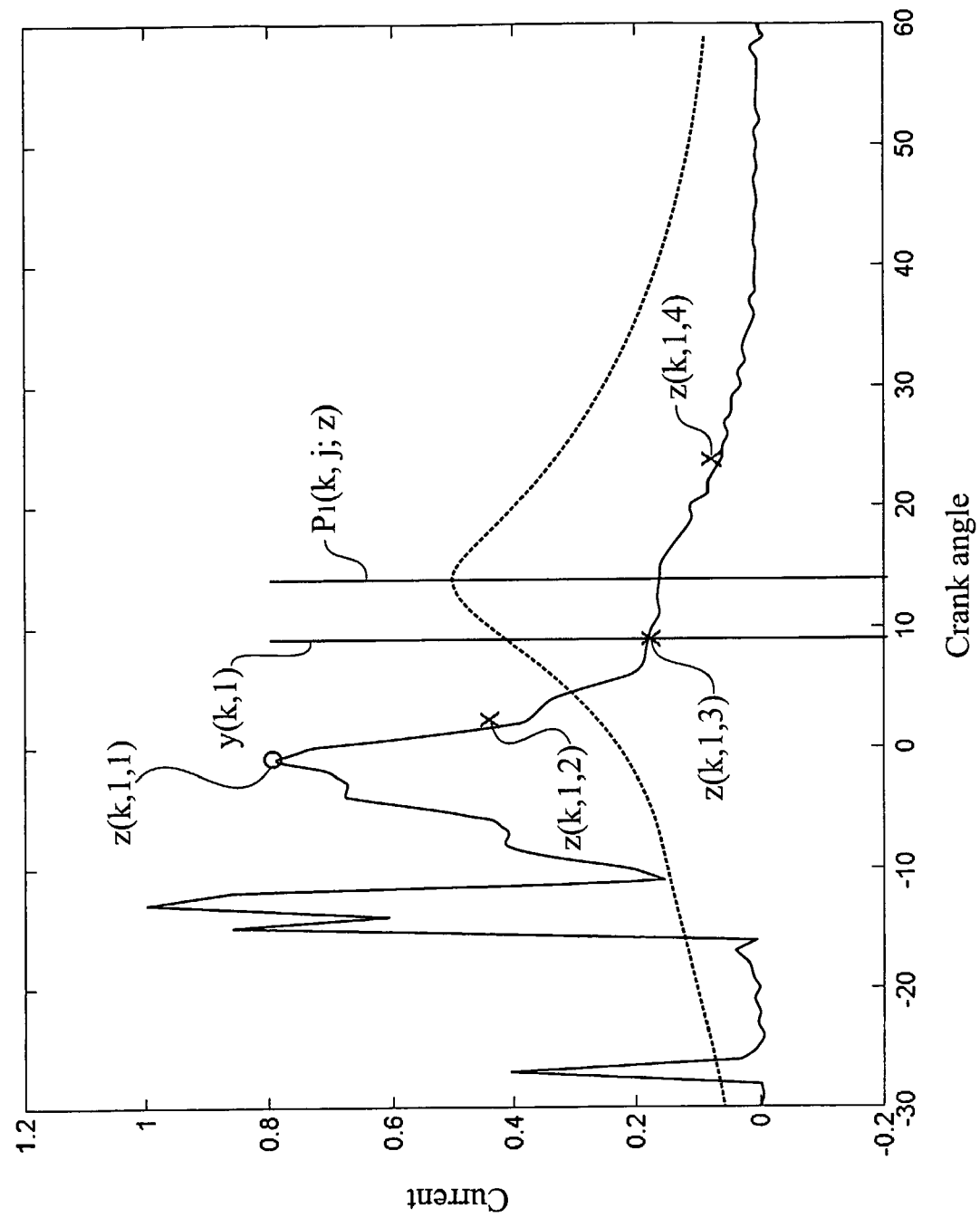
FIG. 6b shows the ion current during a single cycle and, a set of candidates for the peak pressure location where the PPL is found at an inflexion point.

FIG. 6a shows a graph of the ion current during a single cycle and a method of steps 101 to 104 of FIG. 2 to derive a measurement y(k, 1) of the PPL. Using theoretical background and/or practical experiments it is possible to derive a prior $P_1(k, j; z)$ which in this example is chosen as the expected PPL probability density as a function of the spark timing. This is easily derived using known relationships between the pressure development in the cylinder and the spark timing and the working condition of the engine (RPM and load). From combustion theory it is expected that the peak pressure location PPL will occur at a maximum in the ion current, marked by 'O' in FIG. 6a, or an inflexion point, marked by 'X'. The dotted line 5 indicates a theoretical pressure trace in the cylinder, where the maximum of the theoretical pressure has been used to derive the prior $P_1(k, j; z)$. The candidates for PPL are chosen as the maxima and inflexion points in the ion current, possibly after a low pass filter operation in order to avoid high frequency disturbances such as thermal noise. The candidates in this example are marked z(k, 1, 1) ... z(k, 1, 8) in FIG. 6a. According to the invention the candidate that minimizes the risk $R_1(k, 1, n)$ is chosen as the measurement y(k, 1). If the prior is symmetrical, e.g., Gaussian distributed, then the risk function is simply the geometric distance between the expected PPL and the corresponding candidates z(k, 1, 1) ... z(k, 1, 8). Other probability density distributions are, of course, possible. The candidate that minimizes the risk is chosen as the measurement. The graph of FIG. 6a yields the result that the candidate z(k, 1, 7) minimizes the risk and is therefore chosen as the measurement, i.e., y(k, 1)=z(k, 1, 7). In this example a local maximum in the ion current indicated the PPL. However, at other working conditions of the engine, an inflexion point may indicate the PPL such as in the example of FIG. 6b, where four candidates were derived. In this case the candidate z(k, 1,3) gives the least risk $R_1(k, 1, n), n=1 \ldots 4$ and is therefore chosen as the measurement, i.e., y(k, 1)=z(k, 1, 3). It is evident that if there is only one candidate, then this candidate will be chosen as the measurement.

Figure 7A:
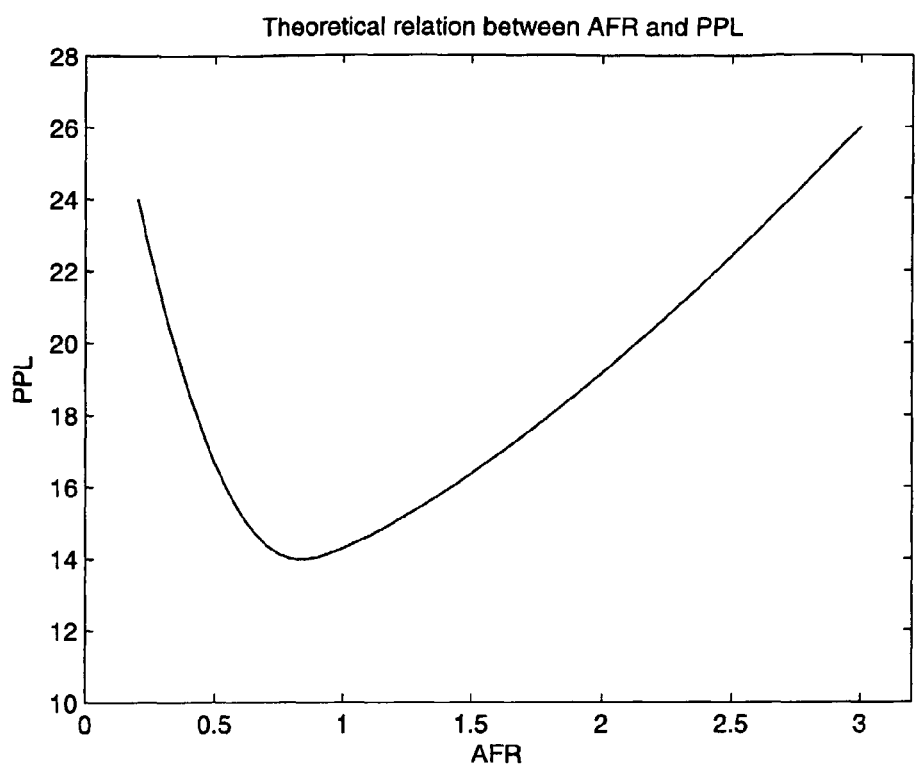
FIG. 7a shows the theoretical relationship between the AFR and the PPL.
Figure 7B:
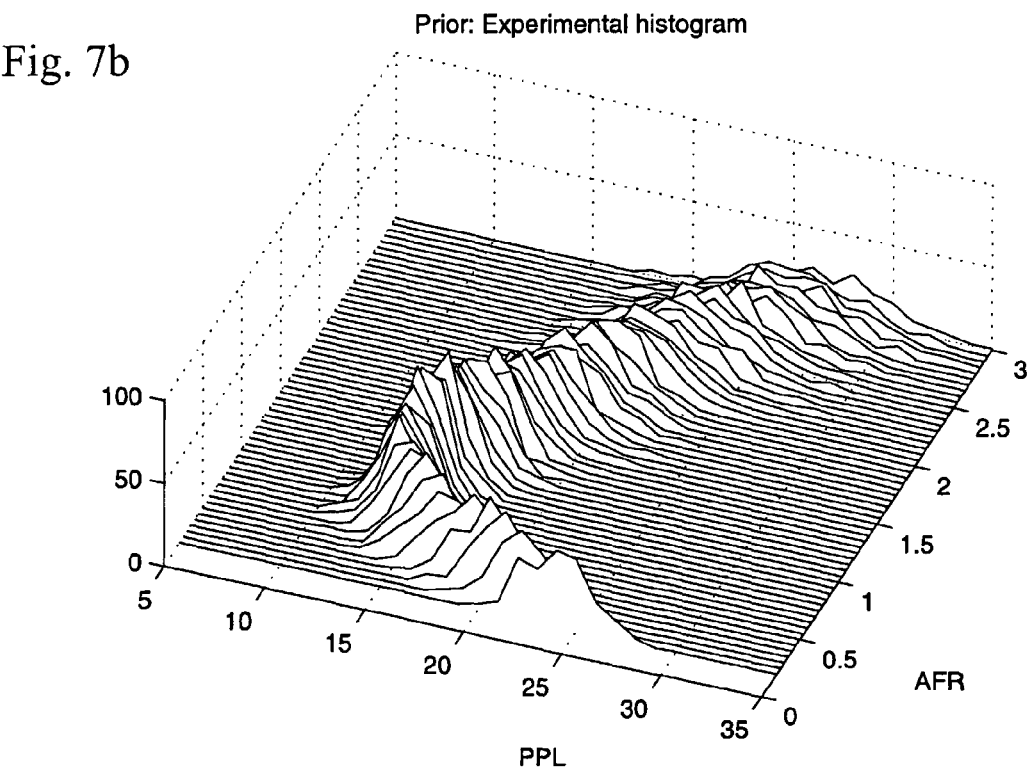
FIG. 7b shows a two dimensional histogram vs. PPL and AFR, i.e., a prior entirely based on experimental results.
Figure 7C:
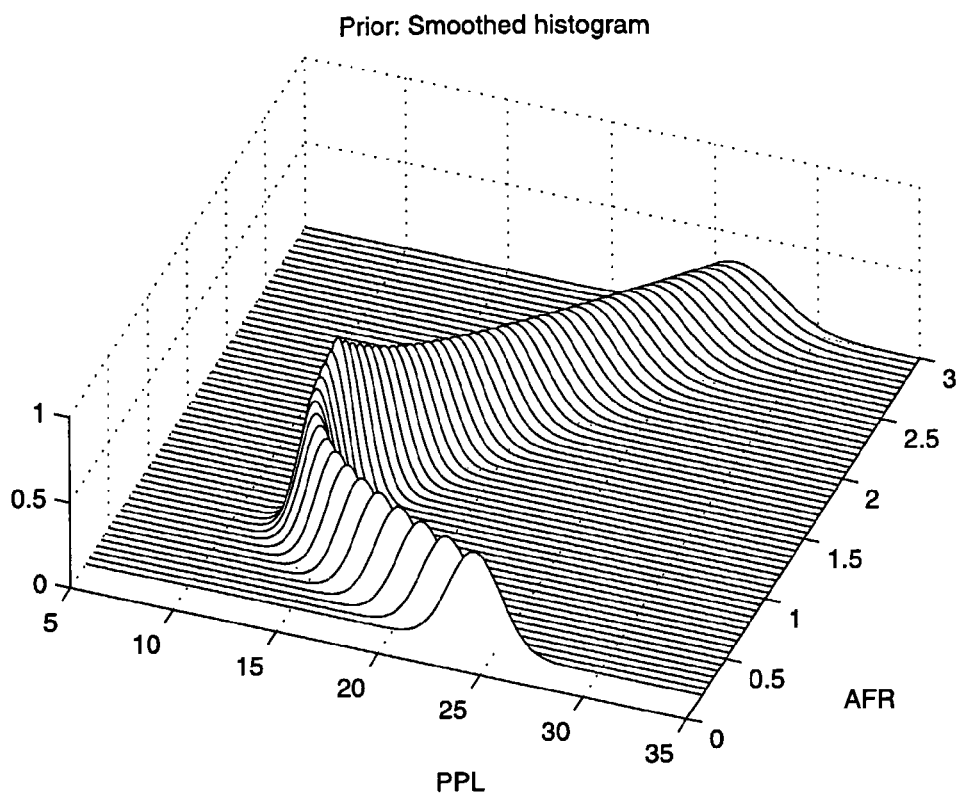
FIG. 7c shows a smoothing of the histogram in FIG. 7b.
Figure 7D:
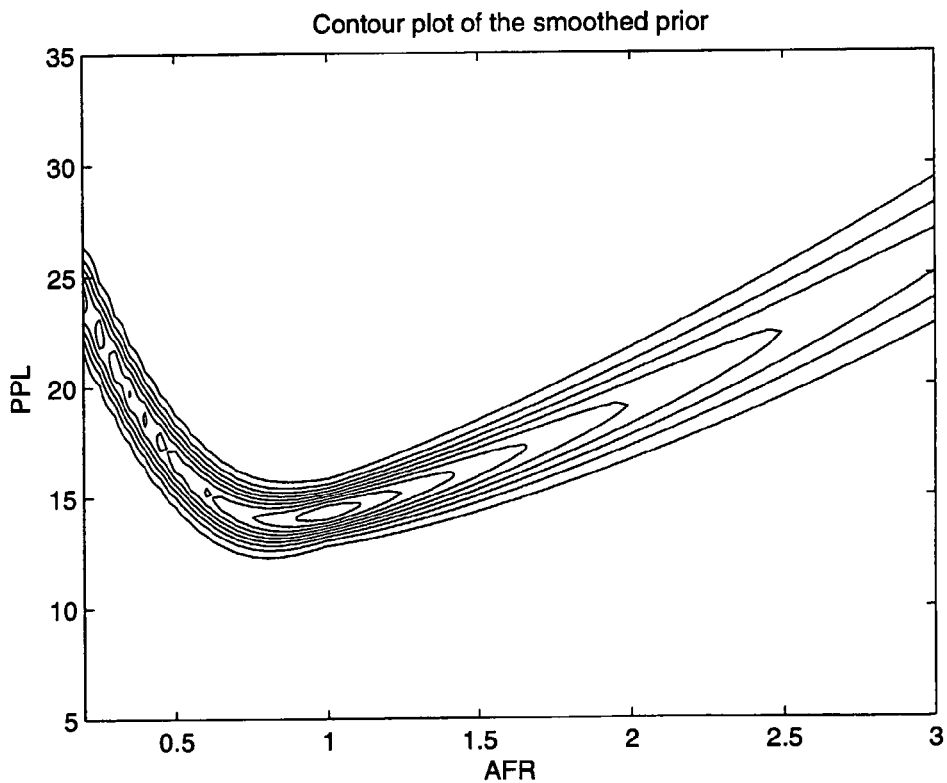
FIG. 7d shows a contour plot of FIG. 7c,
FIG. 8a-h show examples of AFR and PPL estimates using the proposed method.

Consider FIGS. 7a-d that show examples of the relationship between AFR and PPL and how this can be used to form a prior. FIG. 7a shows a theoretical relationship between AFR and PPL, FIG. 7b shows a histogram over the number of occurrences as function of AFR and PPL in an experimental setup, FIG. 7c shows a smoothed version of FIG. 7b and FIG. 7d shows a contour plot of FIG. 7c.

The smoothed histogram H(X) shown in FIG. 7c can be used for simultaneous estimation of PPL and AFR. The prior can be interpreted as a probability density function (not necessarily normalized) with the PPL and AFR on the x- and y-axes, respectively, and the probability for such a combination of PPL and AFR on the z-axis. For AFR equal to 0.89 there is a minimum which is clearly seen in FIG. 7a and is explained by that for this AFR the burn rate of the fuel mixture is at it's maximum. Hence, increasing or decreasing the AFR will result in a lower burn rate, and as a result the PPL will increase. A prior can be constructed by repetitive measurements in a laborative environment (engine dynamometer) in conjuncture with known physical relationships such as the relationship between AFR and PPL mentioned above. A histogram over PPL and AFR is an example of prior information that can be used to refine the quality of combustion parameter estimates. The prior may, however, depend on other variables as well, such as air humidity and fuel quality. If these quantities are not measured, then the prior may be made dependent on the measurements using a suitable linear or non-linear transform of the data.

Figure 8A:
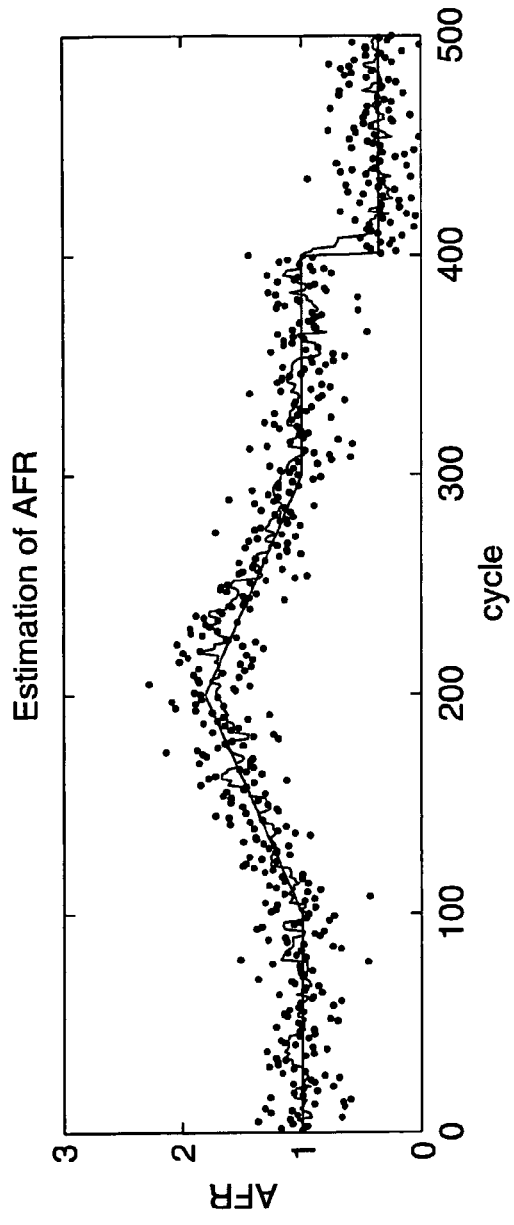
FIG. 8i-j show the prior and the risk for the same case as in FIG. 8a-h.
Figure 8B:
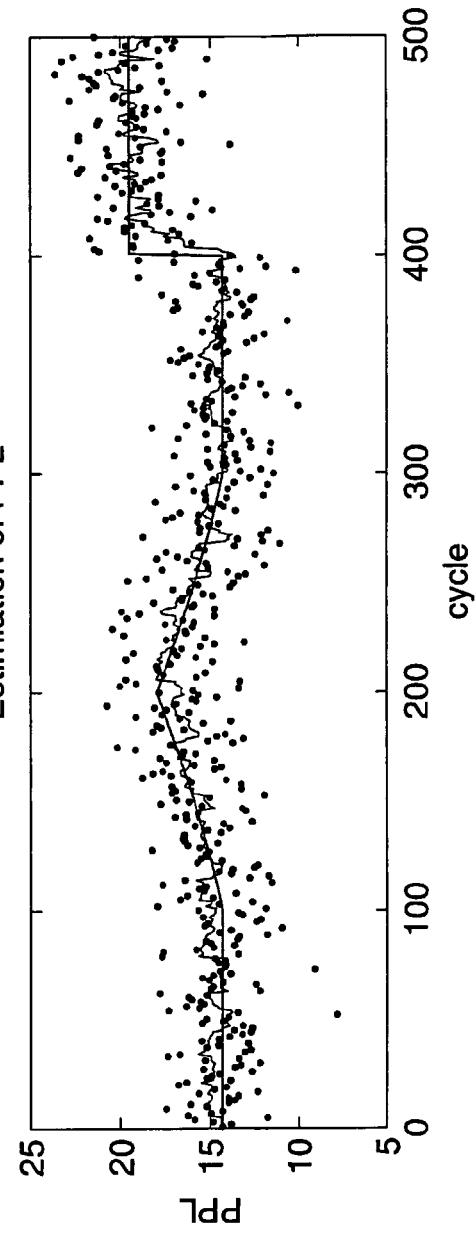
Figure 8C:
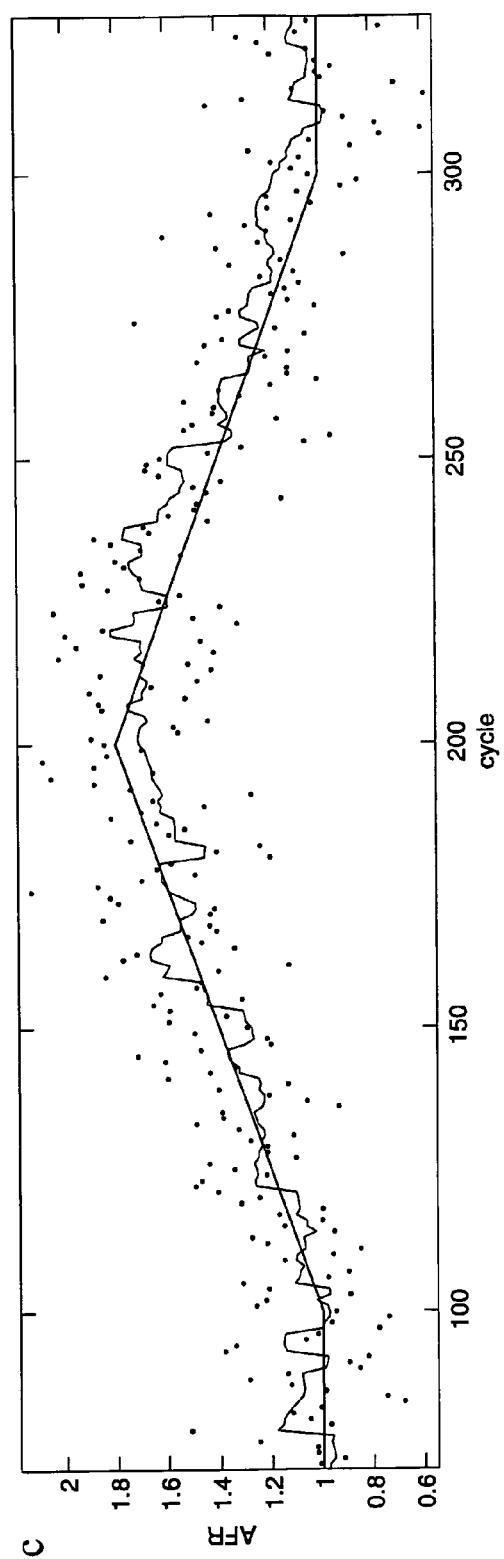
Figure 8D:
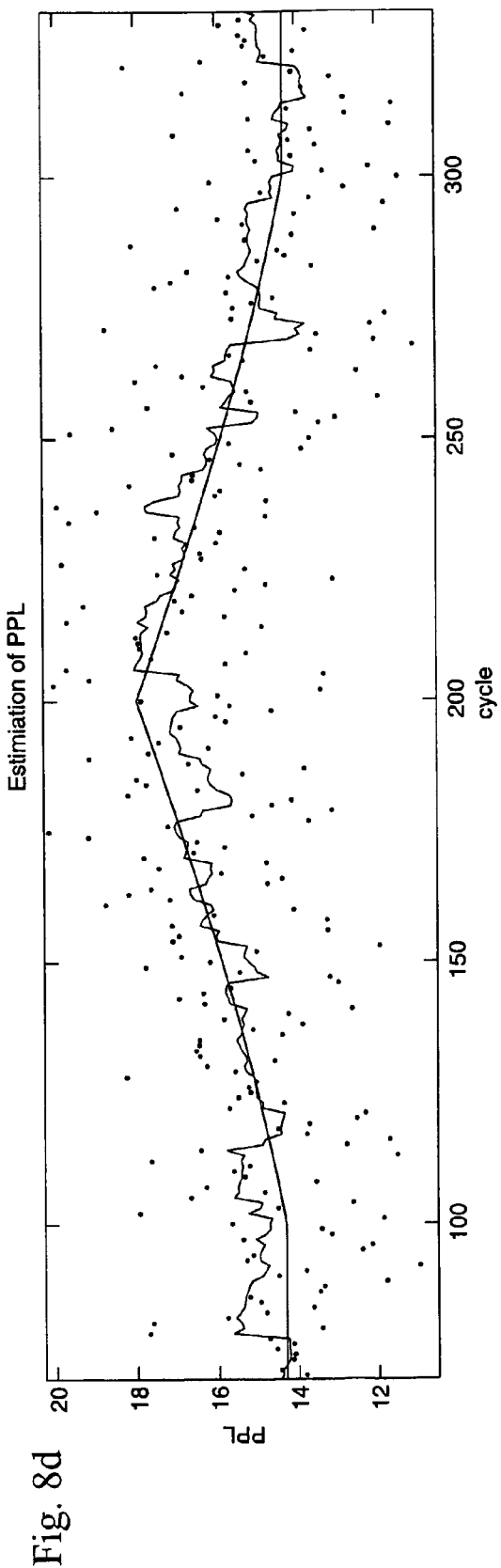
Figure 8E:
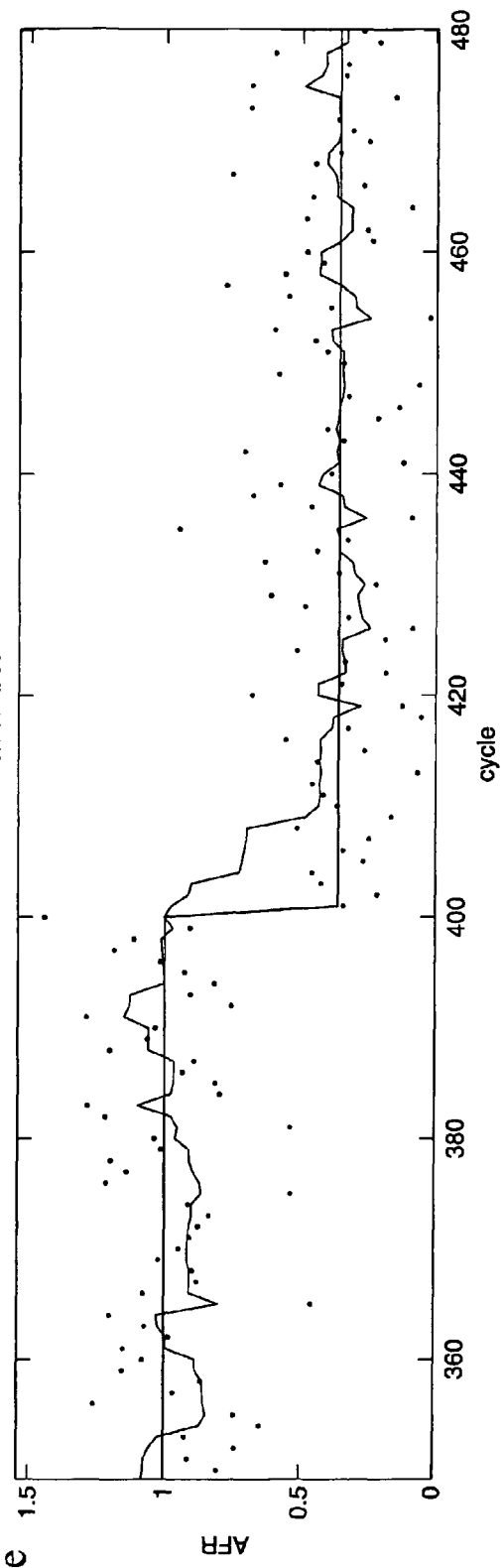
Figure 8F:
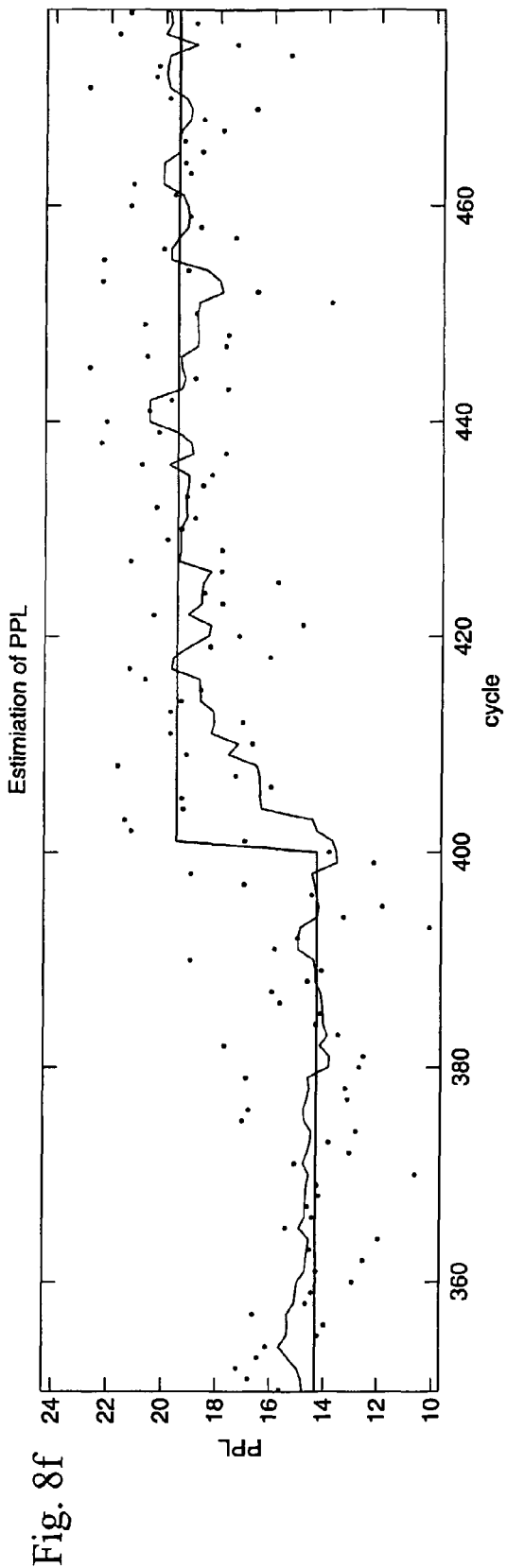

FIGS. 8a-b illustrates possible measurements and estimates of AFR and PPL, respectively, using the invention. The solid straight line in FIGS. 8a-b is the true combustion parameter value, the solid irregular line is the estimate and the dots are the measurements. FIGS. 8c-d show a zooming of the "ramp change" in FIG. 8a-b, and FIGS. 8e-f show a zooming of the step change. In FIGS. 8a-f, the measurements Y(k, 1) for PPL and y(k, 2) for AFR (dots) are spread around the true values v(k, 1) and v(k, 2) (solid straight) due do inaccuracies in the measuring method. The estimates x(k, 1) and x(k, 2), however, are close to the true values v(k, 1) and v(k, 2) and are much more accurate than the measurements y(k, 1) and y(k, 2). Specifically, the tracking performance is good, i.e., the ability to follow changes in me combustion parameters from cycle to cycle with a minimum of time delay.

FIG. 8g shows measurements plotted versus their AFR and PPL co-ordinate together with the theoretical relationship between AFR and PPL (FIG. 7a, solid line). The measurements are spread due to noise.

FIG. 8h is the same as FIG. 8g, but with the estimates plotted versus their AFR and PPL co-ordinate. The estimates are much less spread than the measurements (FIG. 8g). FIG. 8i-j shows the prior $P_2(k; X, Y)$ and the risk function $R_2(k; X, Y)$ versus cycle number k. The risk changes with the cycle number.

FIGS. 8a-j illustrate that the invention can be used to produce robust and accurate estimates using inaccurate measurements from inexpensive sensors. By using the methods of the invention it is possible to obtain a close match between the estimates and the true values, even if the measurements are very noisy.

The above-mentioned method can of-course be applied to the estimation of all possible different combustion parameters and not only to those mentioned above. Moreover, the estimates can also be used in a detection strategy to detect, for example, knock and misfire or the lean-burn limit.

The term prior has been used extensively and the meaning of it in this context is defined here for clarity. By prior is meant an a priori source of information from which a probability measure for combustion parameter measurements or estimates can be computed. Such a prior can be in the form of a look-up table or a probability density function or some other linear or non-linear transform of data. It is to be understood that the prior is different from the well-known look-up tables (engine maps) used for traditional engine control. The look-up table used in the traditional context is a preconfigured fable with engine data used for open loop control. In this case a set of variables, such as RPM and load, are used as indexes in the look-up table, where the appropriate control parameters are stored (such as spark advance, fuel injection etc). In the invention the look-up tables (priors) are used to estimate combustion parameters and they may contain information about correlations and covariance between parameters and/or probability distributions of the parameters. The prior may also depend on measurements of different kinds. For example, the prior may be a function of the throttle angle since given the throttle angle a certain AFR is expected. Assume the individual AFR's in the cylinders need to be estimated. Then the prior can absorb this a priori (throttle angle) knowledge by an appropriate weighting of a more general prior.

The prior is used in some kind of risk function, which is minimized with respect to the combustion parameters using some kind of search or other minimization algorithm. There are, of-course, many algorithms that can be used for such a minimization. In the text above a simple recursive scheme was described to illustrate the basic idea when using a prior. A more effective algorithm would be to also incorporate the statistical properties of the parameter estimates such as their co-variance matrix to refine the search (updating) direction. Stated differently, it is most often not optimal to go from parameter state vector $X(k-1)$ directly in the direction towards $Y(k)$, see for example S. M Kay, "Fundamentals of Statistical Signal Processing, Estimation Theory", Prentice Hall Signal Processing Series, 1998.

The invention claimed is:

1. A method for control of a combustion engine comprising an engine, at least one sensor and at least one engine control unit (200) arranged to control the engine (100) by the use of real time sensor data $S(k)$, comprising the steps of using a prior ($P_1(k,j;z)$, to derive at least one combustion parameter measurement ($y(k,j)$) from the real time sensor data ($S(k)$), and using the at least one combustion parameter measurement ($y(k,j)$) in performing said engine control, wherein within a single combustion cycle ($k$), the prior ($P_1(k,j;z)$) is used in order to select a combustion parameter candidate ($z(k,j,n)$) from a set of candidates ($z(k,j,1) \ldots z(k,j,N)$) as the measurement ($y(k,j)$) of the combustion parameter ($v(k,j)$).

2. The method according to claim 1, wherein a candidate with the lowest risk is chosen as the combustion parameter measurement ($y(k,j)$).

3. The method according to claim 1, wherein the combustion parameter estimates ($X(k-1)$) from former combustion cycles, real time sensor data ($S(k)$) and combustion parameter measurements ($Y(k)=(y(k,1), \ldots, y(k,J))^T$) and a prior ($P_2(k;X,Y)$) are used to obtain a combustion parameter estimate ($X(k)$) of the current combustion cycle and the combustion parameter estimate ($X(k)$) is used in performing said engine control.

4. The method according to claim 3, wherein the combustion parameter estimate ($X(k)$) of the current combustion cycle is derived using a risk function based on a prior ($P_2(k;X,Y)$) and the combustion parameter estimates ($X(k-1)$) from former combustion cycles and the combustion parameter measurements ($Y(k)$) of the current cycle.

5. The method according to claim 1, wherein the prior ($P_1(k,j;z)$, $P_2(k;X,Y)$) is to some extent derived from combustion theory.

6. The method according to claim 1, wherein the prior ($P_1(k,j;z)$, $P_2(k;X,Y)$) is to some extent derived from practical experiments in a model engine.

7. The method according to claim 1, wherein the prior ($P_1(k,j;z)$, $P_2(k;X,Y)$) is to some extent updated by analyzing the performance of the engine during the operation of the engine.

* * * * *